(12) United States Patent
Winn

(10) Patent No.: US 7,592,721 B2
(45) Date of Patent: Sep. 22, 2009

(54) TORQUE TRANSMISSION ASSEMBLY FOR SUPERCONDUCTING ROTATING MACHINES

(75) Inventor: Peter M. Winn, Shrewsbury, MA (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 11/533,595

(22) Filed: Sep. 20, 2006

(65) Prior Publication Data
US 2008/0067881 A1 Mar. 20, 2008

(51) Int. Cl.
*H02K 9/00* (2006.01)
(52) U.S. Cl. .......................... 310/52; 310/261
(58) Field of Classification Search ............. 310/52–59, 310/64, 261
See application file for complete search history.

(56) References Cited

U.S. PATENT DOCUMENTS

| | | | | |
|---|---|---|---|---|
| 4,082,967 A * | 4/1978 | Laskaris | | 310/64 |
| 4,085,343 A * | 4/1978 | Hasegawa et al. | | 310/52 |
| 4,117,357 A * | 9/1978 | Baumann | | 310/52 |
| 4,176,291 A * | 11/1979 | Rabinowitz | | 310/52 |
| 4,250,418 A * | 2/1981 | Eckels | | 310/64 |
| 4,267,473 A * | 5/1981 | Gamble | | 310/52 |
| 4,295,068 A * | 10/1981 | Gamble | | 310/52 |
| 4,319,149 A * | 3/1982 | Eckels | | 310/52 |
| 5,880,547 A | 3/1999 | Shoykhet | | |
| 6,674,206 B2 | 1/2004 | Maguire et al. | | |
| 6,700,274 B2 | 3/2004 | Gamble et al. | | |
| 2004/0017117 A1* | 1/2004 | Kwon et al. | | 310/61 |

FOREIGN PATENT DOCUMENTS

| JP | 59191475 A | 10/1984 |
|---|---|---|
| JP | 04340361 A | 11/1992 |
| WO | WO03/023941 A1 | 3/2003 |

* cited by examiner

*Primary Examiner*—Thanh Lam
(74) *Attorney, Agent, or Firm*—Occhiuti Rohlicek & Tsao LLP

(57) ABSTRACT

A rotor assembly includes a superconducting winding assembly positioned within a cryogenic region of the rotor assembly. In operation, the superconducting winding assembly generates a magnetic flux linking a stator assembly. The rotor assembly also includes a torque transfer assembly that includes first and second tubes that are positioned in a radial space external to the superconducting winding assembly and that extend along a longitudinal axis of the rotor assembly.

25 Claims, 5 Drawing Sheets

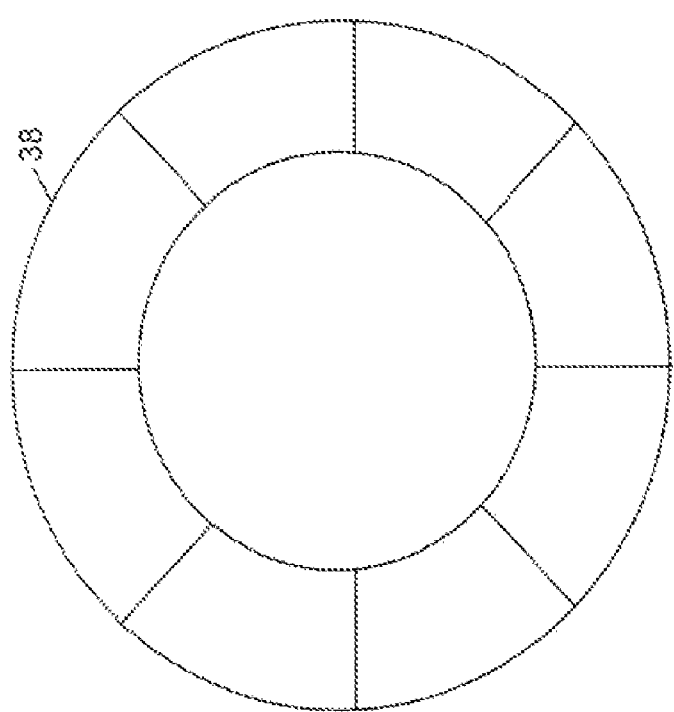

TORQUE TRANSMISSION ASSEMBLY FOR SUPERCONDUCTING ROTATING MACHINES

INCORPORATION BY REFERENCE

This application herein incorporates by reference the following applications: U.S. application Ser. No. 09/415,626, which was filed on Oct. 12, 1999, U.S. application Ser. No. 09/480,430, filed Jan. 11, 2000, U.S. application Ser. No. 09/480,397, filed Jan. 11, 2000; U.S. application Ser. No. 09/481,483, filed Jan. 11, 2000; U.S. application Ser. No. 09/481,480, filed Jan. 11, 2000; U.S. application Ser. No. 09/481,484, filed Jan. 11, 2000, U.S. application Ser. No. 09/480,396, filed Jan. 11, 2000; and U.S. application Ser. No. 09/909,412, filed Jul. 19, 2001.

BACKGROUND OF THE INVENTION

The invention relates to the construction and operation of superconducting rotating machines, and more particularly to torque transmission assemblies in superconducting rotating machines.

Superconducting electric machines have been under development since the early 1960s. The use of superconducting windings in these machines has resulted in a significant increase in the magnetomotive forces generated by the windings and increased flux densities in the machines. However, superconducting windings require cryogenic temperatures to operate properly. Thus, superconducting motors and generators are being developed to include mechanisms for transferring the torque between a rotor assembly and an output shaft while limiting heat transported to the cryogenic region of the machine.

SUMMARY OF THE INVENTION

The invention relates to rotor assemblies, as well as rotating machines (e.g., motor or generator) having such rotor assemblies. The rotor assembly is of the type configured to rotate within a stator assembly of the rotating machine and having a shaft disposed within a non-cryogenic region of the rotor assembly.

In one aspect of the invention, the rotor assembly includes a superconducting winding assembly positioned within a cryogenic region of the rotor assembly. In operation, the superconducting winding assembly generates a magnetic flux linking the stator assembly. The rotor assembly also includes a torque transfer assembly that includes two tubes that are positioned in a radial space external to the superconducting winding assembly and extend along a longitudinal axis of the rotor assembly.

Embodiments of this aspect of the invention may include one or more of the following features. The torque transfer assembly may be mechanically coupled to the superconducting winding assembly and may extend between the non-cryogenic region and the cryogenic region of the rotor assembly. The rotor assembly may include a flange in which the torque transfer assembly axially extends from the flange and over a portion of the superconducting winding assembly. The lengths of the two tubes may be sufficient to provide thermal isolation of the superconducting winding assembly. The torque transfer assembly may include a ring to mechanically couple to the superconducting winding assembly. For example, a first ring may mechanically couple the first tube to the superconducting winding assembly and a second ring may mechanically couple the second tube to the superconducting winding assembly. Flanges may also mechanically couple to the tubes. For example, one tube may be mechanically coupled to one flange and extend over a portion of the superconducting winding assembly, and another tube may be mechanically coupled to another flange and extend over another portion of the superconducting winding assembly. The length of the tubes may be equivalent or different. A space between the tubes may sufficient for providing substantial thermal isolation of the superconducting winding assembly. The space may also be sufficient for providing support to the superconducting winding assembly. The tubes may be produced from various materials such as thermally conductive materials (e.g., Inconel). The rotor assembly may also include spokes, in which each spoke may be mechanically fix the superconducting winding assembly to the shaft. One of the tubes may be mechanically coupled to the ring with a weld joint. The superconducting winding assembly may include a high temperature superconductor. The superconducting winding assembly may also include a support tube. The rotor assembly may be used in relatively high speed applications. For example, rotation speeds of at least 3000 rpm may be used.

In one aspect of the invention, a rotating machine includes a shaft disposed within a non-cryogenic region of the rotating machine and a stator assembly. The rotating machine also includes a rotor assembly surrounded by the stator assembly. The rotor assembly a superconducting winding assembly positioned within a cryogenic region of the rotor assembly. In operation, the superconducting winding assembly generates a magnetic flux linking the stator assembly. The rotor assembly also includes a torque transfer assembly that includes two tubes that are positioned in a radial space external to the superconducting winding assembly and extend along a longitudinal axis of the rotor assembly.

Embodiments of this aspect of the invention may include one or more of the following features. The rotor assembly may include a flange such that the torque transfer assembly axially extends from the flange and over a portion of the superconducting winding assembly. The lengths of the tubes may be sufficient for providing substantial thermal isolation of the superconducting winding assembly. A space between the tubes may also provide thermal isolation of the superconducting winding assembly. The space between the tubes may also be sufficient for providing support to the superconducting winding assembly. The torque transfer assembly may include one ring to mechanically couple the first tube to the superconducting winding assembly and another ring to mechanically couple the second tube to the superconducting winding assembly. The first tube may be mechanically coupled to a first flange and axially extend over a portion of the superconducting winding assembly, and the second tube may be mechanically coupled to a second flange and axially extend over another portion of the superconducting winding assembly. The tubes may comprise one or more types of thermally conductive materials (e.g., Inconel) and composite materials.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 3A illustrates an arrangement of spokes of the rotor assembly of FIG. 3.

DETAILED DESCRIPTION

Figure 1:
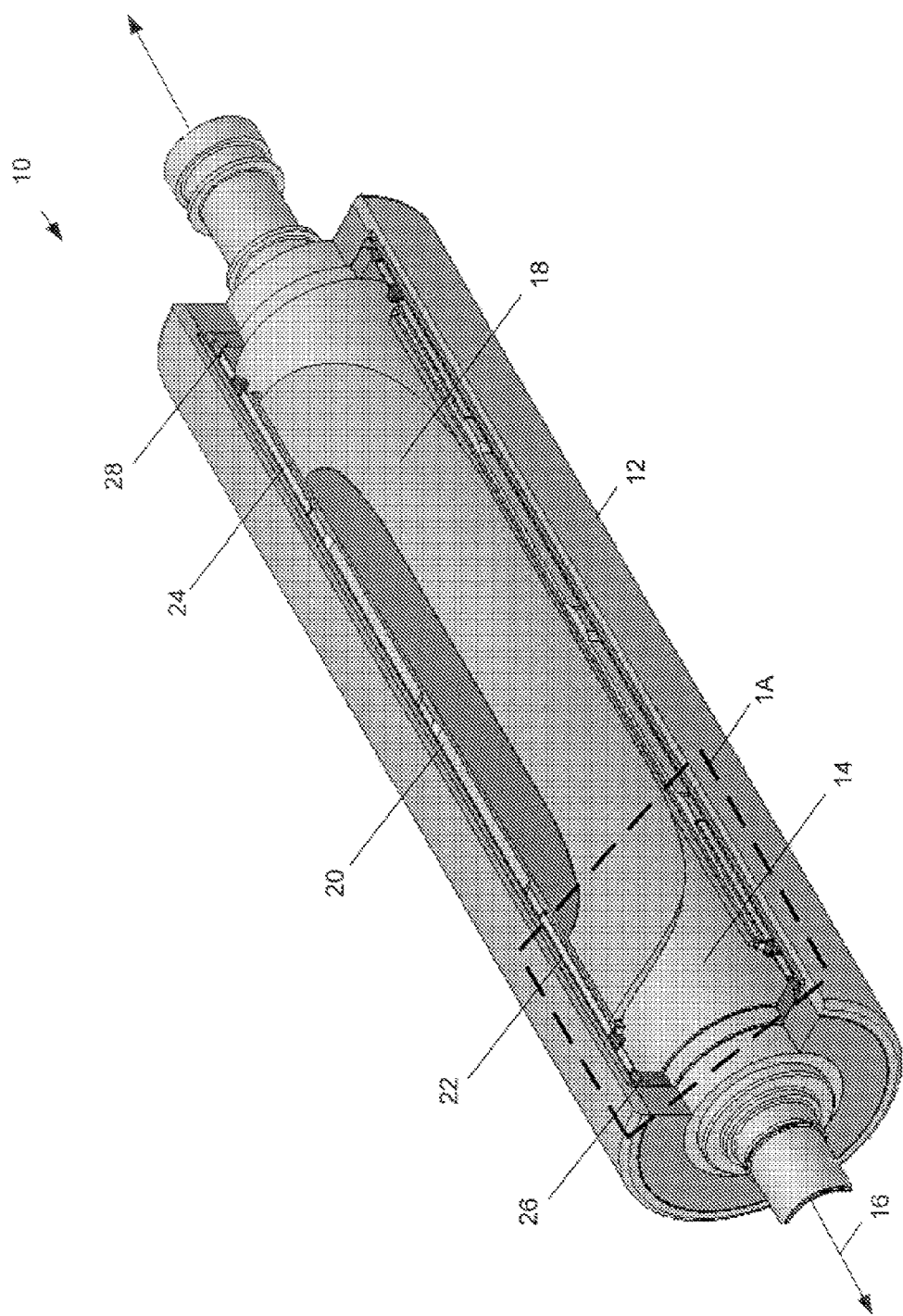
FIG. 1 is a cross-sectional perspective view of a rotor assembly.
Figure 1A:
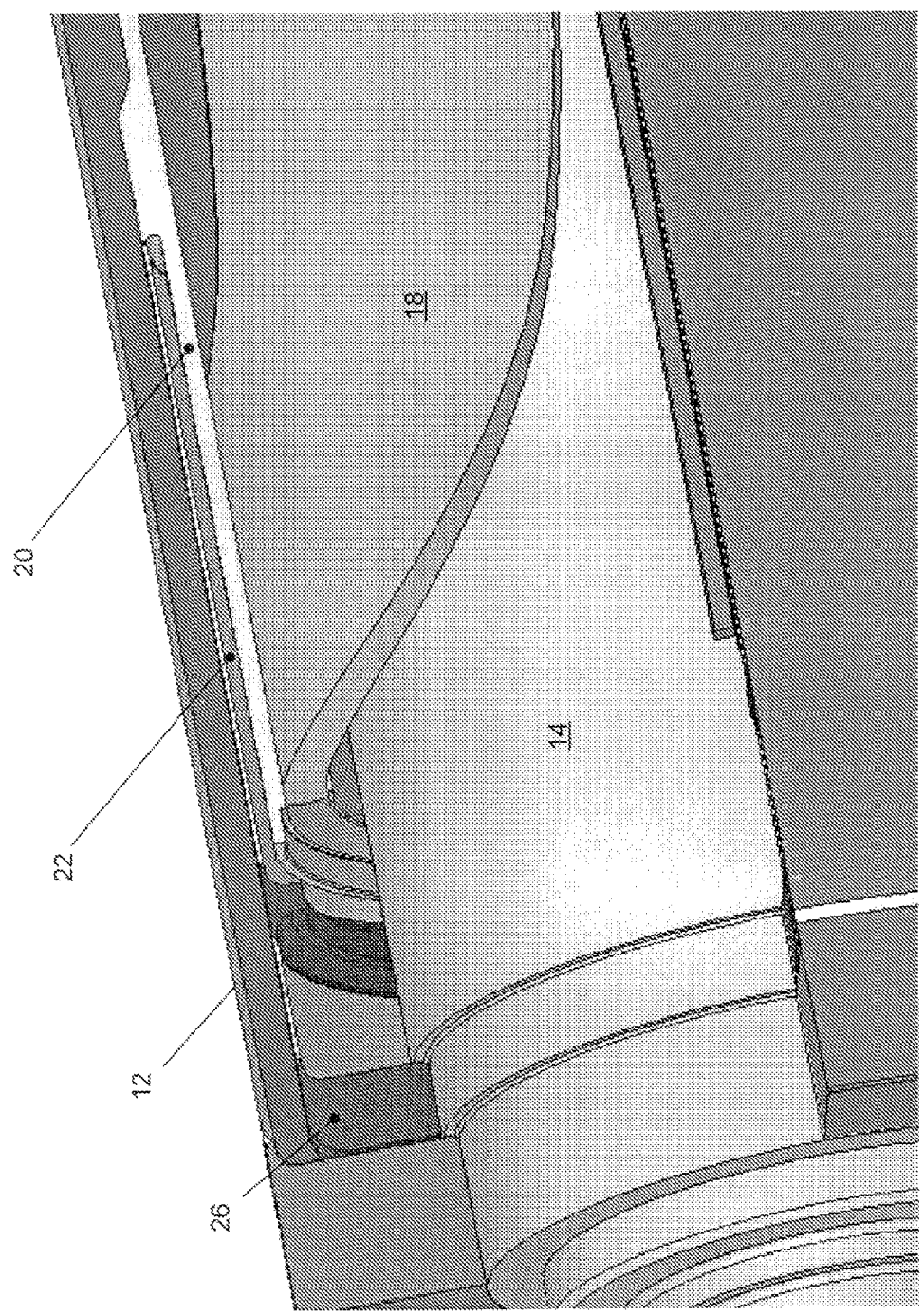
FIG. 1A is an enlarged cross-sectional view of a portion of FIG. 1.

Referring to FIGS. 1 and 1A, a rotor assembly 10 of a superconducting synchronous machine is shown. In this perspective view, a portion of an electromagnetic shield 12 is cut away to reveal internal components of the rotor assembly 10. For example, a shaft 14 is shown that extends along a longitudinal axis 16 of the rotor assembly 10. Superconducting windings 18, when in operation, generate a magnetic flux that link to a stator assembly (not shown). In some examples, the superconducting windings may be arranged in one or more topologies for producing electrical poles (e.g., a six-pole topology). The superconducting windings 18 may be shaped (e.g., racetrack shaped) to efficiently generate the magnetic flux as provided (along with other construction details) by U.S. Ser. No. 09/359,497, which is incorporated herein by reference. Rotor assembly 10 further includes an exciter (not shown), examples of which are described in greater detail in U.S. Ser. No. 09/480,430, which is also incorporated herein by reference.

Rotor assembly 10 includes a windings support tube 20 that is maintained at cryogenic temperatures and is fabricated from a high-strength and ductile material (e.g., stainless steel, Inconel, 9 nickel steel, 12 nickel steel, etc.). Constructing winding support tube 20 from 9 nickel steel or 12 nickel steel is advantageous due to their ferromagnetic properties that may increase the magnetic field in the flux path linking the stator assembly. A cryocooler (not shown), external to rotor assembly 10, provides a coolant such as helium to the rotor assembly. As will be described in greater detail below, rotor assembly 10 and its components have features that increase the overall performance of the generator, especially under relatively high speeds (e.g., speeds in excess of 3000 rpm, for example) with high or lower torque conditions. However, techniques and features of the rotor assembly 10 may also be incorporated into lower speed implementations with high or lower torque conditions.

In particular, rotor assembly 10 includes two torque tubes 22, 24 for transferring the rotational forces generated by the rotor assembly to the shaft 14. In this arrangement, respective flanges 26, 28 are coupled to the torque tubes 22, 24 for transferring the forces from the rotor assembly 10 to the shaft 14. Shaft 14 then transmits the rotational energy to, for example, a propeller, a transmission system, or other similar device or system. Shaft 14 is typically formed of steel and is not cooled (i.e., it remains at ambient temperature). In some examples, the shaft 14 alone or in conjunction with a surrounding sleeve (not shown) may be produced of a ferromagnetic material such as magnetic steel or iron to lower reluctance thereby increasing the amount of magnetic flux through the flux path linking the stator assembly.

Windings support tube 20 provides support to the superconductor windings 18 such that the windings retain their coiled shape (e.g., racetrack shape). For relatively high rotational speed applications, the superconducting windings 18 are mounted to the inside of the windings support tube 20. As such, the windings support tube 20 is located at a radial position further away from the longitudinal axis 16 than the superconducting windings 18. At such rotational speeds, centripetal forces may push the windings radially outward. By covering the superconductor windings 18 with the support tube 20, the windings are substantially held in place to retain their shape.

Torque tubes 22 and 24 are radially positioned external to the windings support tube 20 for the relatively high rotational speed applications of the rotor assembly 10. As highlighted in FIG. 1, a portion of the rotor assembly 10 is enlarged in FIG. 1A. As shown more clearly in FIG. 1A, the torque tube 22 is positioned between the windings support tube 20 and the electromagnetic shield 12 and extends along the longitudinal axis 16 of the rotor assembly 10. Although not shown, torque tube 24 is positioned at a similar radial location between the windings support tube 20 and the electromagnetic shield 12.

To transfer rotational forces of rotor assembly 10 while minimizing heat transfer between warm and cold components, an end of the torque tube 22 is mechanically coupled (e.g., welded) about its circumference to the flange 26 that extends radially from shaft 14. Similarly, the flange 28 (shown in FIG. 1) at the opposite end of the rotor assembly 10 is coupled to the torque tube 24. The torque tubes 22 and 24 extend along the longitudinal axis 16 to cover end portions of the windings support tube 20 and the superconducting windings 18.

Along with transferring torque and mechanically supporting the superconducting windings 18, the torque tubes 22, 24 also provide thermal isolation between the cryogenic temperatures of the windings and the ambient temperature portions of the rotor assembly 10 such as the shaft 14. To provide the mechanical support and thermal isolation, one or both of the torque tubes 22, 24 may be formed of a high strength and low thermal conductivity material such as Inconel (e.g., Inconel 718), a titanium alloy (e.g., Ti6A14V, etc.) or other similar metallic material. The torque tubes 22, 24 may also be made from a composite material or a combination of metallic and composite materials to provide the structural and thermal properties.

Because torque tubes 22, 24 are formed of high strength material, the length of torque tubes along longitudinal axis 16 can be relatively long even for relatively high speed operating conditions of the rotor assembly 10. The length of torque tubes 22 and 24 in conjunction with their low thermal conductivity reduces heat transfer from warm components to cold components (e.g., superconducting windings 18, windings support tube 20) while effectively transferring torque from the windings to the shaft 14. As discussed below, the lengths of the torque tubes may be adjusted to provide appropriate support and thermal isolation.

The windings support tube 20 may contract in size due to being maintained at the cryogenic temperatures. For example, the windings support tube 20 may contract in length due the cold temperatures. The torque tubes 22, 24 are typically stiffer than the windings support tube 20. For example the spring constant of the torque tubes 22, 24 may be considerably less than the spring constant of the windings support tube 20. Since the torque tubes 22, 24 are much less flexible, less stress is experienced by the torque tubes. Additionally, the low thermal conductivity of the torques tubes provides low thermal conduction between the cryogenic and ambient temperature regions of the rotor assembly 10.

Figure 2:
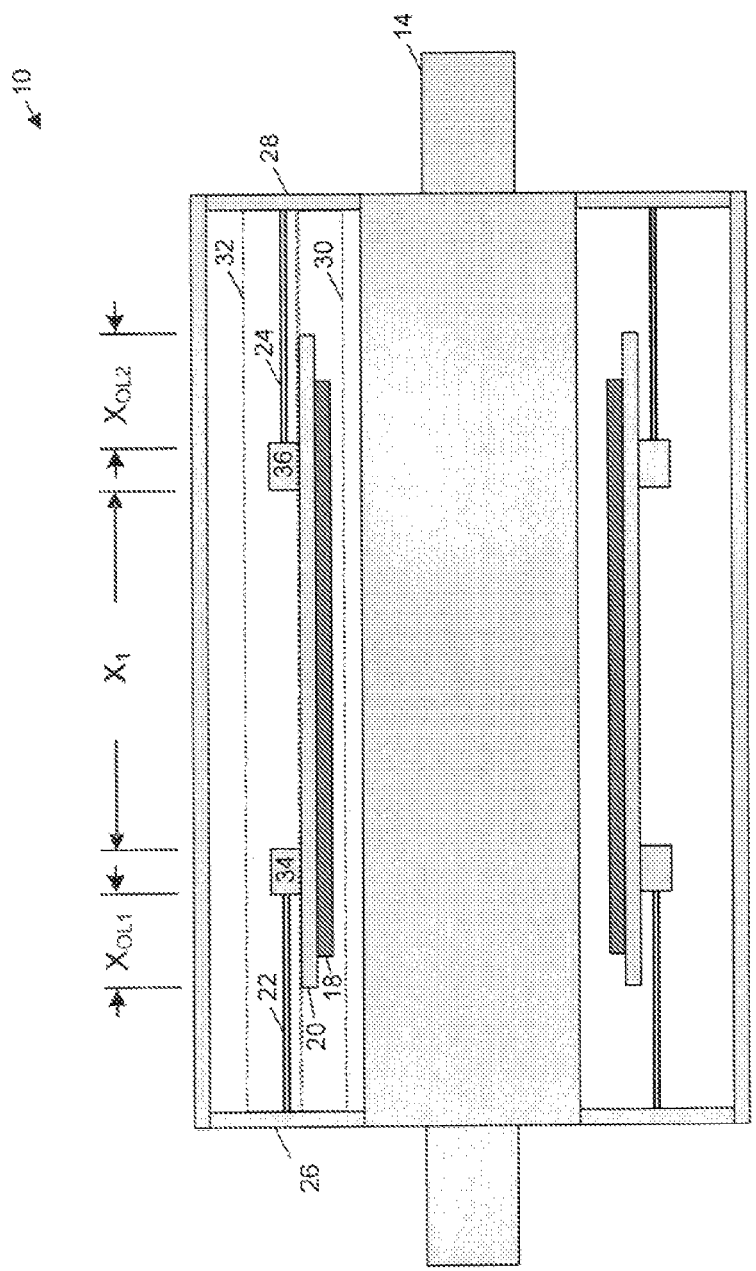
FIG. 2 is a two-dimensional cross sectional view of one embodiment of the rotor assembly.

Referring to FIG. 2, a two dimensional cross-section of the rotor assembly 10 shows a superconducting winding assembly 30 that is maintained at cryogenic temperatures and includes components such as the superconducting windings 18 and the windings support tube 20. Due to the radial symmetry of the rotor assembly 10, only the upper portion of the assembly is described here, however, the descriptions also correspond to the lower portion of the assembly. The rotor assembly 10 also includes a torque transfer assembly 32 that includes components such as the two torque tubes 22, 24 that respectively transfer torque to the shaft 14 via the two flanges 26, 28. Torque transfer assembly 32 thermally isolates the superconducting winding assembly 30 from the ambient temperature portions of the rotor assembly 10.

In this arrangement, respective ends of each of the torque tubes 22, 24 are attached to rings 34, 36 that are radially external to the windings support tube 20. For example, one end of torque tube 22 is mechanically coupled (e.g., welded) to the ring 34 and one end of torque tube 24 is coupled to the ring 36. The torque tubes are separated by a distance along the longitudinal axis 16 of the rotor assembly 10. As represented by the distance "$X_1$", the separation of the torque tubes 22, 24 is dependent upon the length of the tubes, the length of the rotor assembly 10 and the position of the rings 34, 36 along the longitudinal axis 16.

In this example, each of the torque tubes 22, 24 extend over a portion of the windings support tube 20. For example, torque tube 22 extends over a portion of the coil support tube 20 that has a length "$X_{OL1}$" and torque tube 24 extends over an opposing portion of the windings support tube as indicated by length "$X_{OL2}$". By overlapping the windings support tube 20, the torque tubes 22, 24 may be extended a considerable length without needing to extend the length of the rotor assembly 10 along the longitudinal axis 16. This would not be the case if the torque tubes 22, 24 were positioned parallel (at the same radial distance from the longitudinal axis) to the windings support tube 20.

As the lengths of the torque tubes 22, 24 increase, thereby reducing the separation distance "$X_1$", stress is reduced on the torque transfer assembly 10. Additionally, due to the low thermal conductivity of the torque tube material, as the lengths increase, the thermal loading from the torque tube conduction decreases. For example, referring to Appendix A, a torque analysis is provided for the rotor assembly 10 shown in FIG. 2. For this analysis, the separation distance "$X_1$" is assigned a value of 22.5 inches. From the calculations (presented in the MathCad programming language that is produced by the Mathsoft Corporation of Needham, Mass.), the stress present on the torque tubes is approximately 53 ksi and the thermal load from the torque tube conduction is approximately 39 watts. As described below, by decreasing the separation distance, the stress may be reduced along with the thermal load. By reducing the separation distance towards a zero value, stress and thermal loading may be minimized. However, for a zero separation value the two rings 34, 36 would be adjacently positioned and form a single contact point with the windings support tube 20, which may reduce mechanical stability. Thereby, the separation distance typically has a nonzero value.

In some arrangements the windings support tube 20 is made of a metallic material such as stainless steel or non-metallic material such as a composite material. Similarly, one or both of the rings 34, 36 may produced from a metallic material (e.g., Inconel) or a composite material, or a combination of metallic and composite materials.

Figure 3:
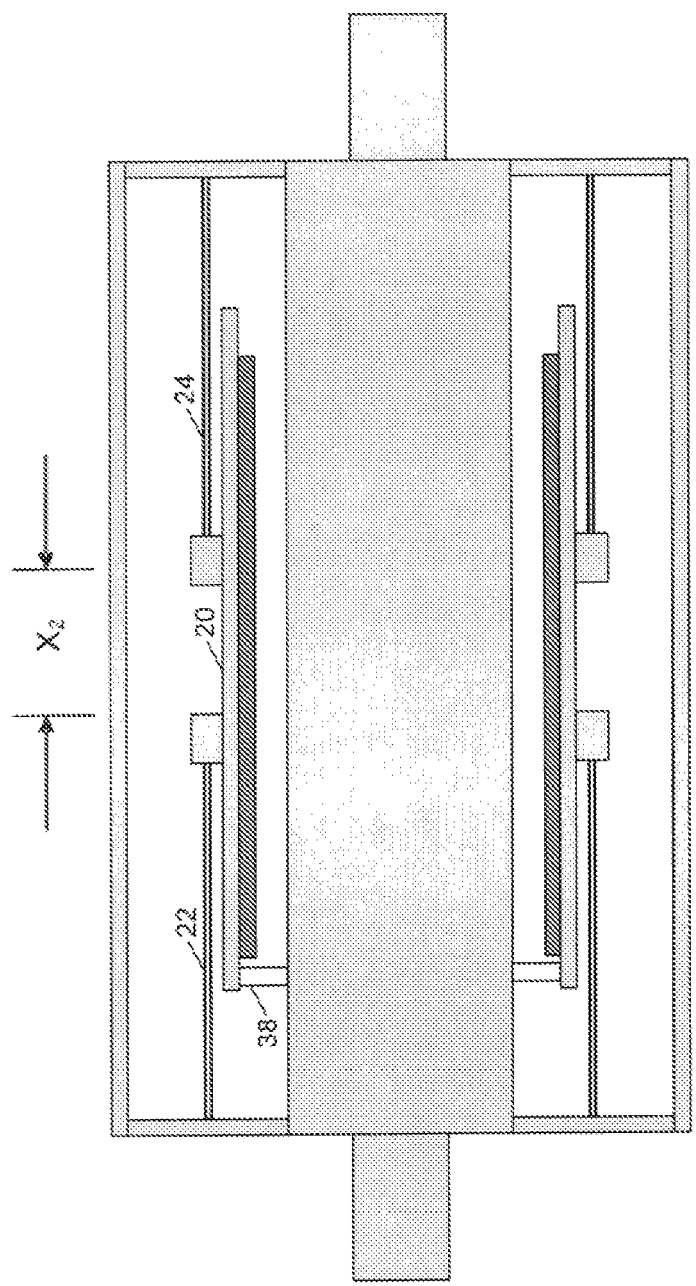
FIG. 3 is a two-dimensional cross sectional view of another embodiment of the rotor assembly.

Referring to FIG. 3, a two-dimensional cross section of another embodiment of rotor assembly 10 is shown. In this example, the two torque tubes 22 and 24 have longer lengths compared to the torque tubes shown in FIG. 2. Correspondingly, the separation distance "$X_2$" between the two torque tubes is smaller than the separation distance "$X_1$" of FIG. 2. By reducing the separation distance between the torque tubes 22, 24, stress in the torque tubes is reduced along with thermal loading from the torque tube conduction. For example, since the spring constant of each torque tube 22, 24 is less than the spring constant of the windings support tube 20, each torque tube may contract considerably less than the coil support tube. For example, the torque tube 22 may contract half the length that the windings support tube 20 contracts.

Referring to Appendix B, a torque analysis of the torque tubes 22, 24 is presented for the reduced separation distance "$X_2$" equal to 7.5 inches. The analysis shows that the stress is approximately 44 ksi, which is considerably reduced from the stress on the torque tubes when separated by distance "$X_1$" (i.e., 53 ksi). The analysis also shows that the thermal load from the torque conduction is approximately 33 watts, which is less than the thermal load experienced for the separation distance of "$X_1$" (i.e., 39 watts). Thus, by extending the lengths of the torque tubes 22, 24 and correspondingly reducing the separation distance, stress in the torque tubes is reduced along with thermal loading.

In the exemplary rotor assemblies shown in FIG. 2 and FIG. 3, both of the torque tubes 22, 24 have equivalent lengths, however, in some arrangements, the torque tubes may have different lengths. Also, in rotor assembly 10, both of the torque tubes 22, 24 are symmetrically positioned about the midpoint of the separation distance (e.g., $X_1$ or $X_2$). However, in some arrangements, torques tubes may be asymmetrically positioned about the midpoint of the separation distance.

Additional support may also be provided to the windings support tube 20, for example, when the rotor assembly 10 is included in a generator that is operating at relatively high-speed conditions. For example spokes 38 (shown in FIG. 3) may be incorporated into the rotor assembly 10 to provide additional support to the windings support tube 20 in the radial direction. Referring also to FIG. 3A, the spokes 38 may be equally spaced (e.g., at $45^O$ intervals), however, in some arrangements the spokes may not be equally spaced. The spokes 38 may also be positioned to provide support other components of the rotor assembly 10. For example, the spokes 38 may be positioned between the shaft 14 and the torque tube 22. Along with spoke spacing intervals, the number of spokes may be varied depending upon the needed support. Furthermore, the spokes 38 may fabricated from high strength and low thermal conductivity material such as Inconel 718, a titanium alloy (e.g., Ti6A14V), or a composite material to reduce heat transfer between the ambient temperature shaft 14 and the cold components of rotor assembly 10.

Still other embodiments are within the scope of the claims. For example, although the rotor assembly shown in FIG. 3 includes one set of spokes 38 coupling the shaft 14 to the windings support tube 20, one or more additional sets of spokes may be positioned to provide support at the opposing end of the windings support tube.

Basic Parameters

-continued $P1 := 40 \cdot 10^6 \cdot \text{watt} \quad \text{rpm} := 3600 \cdot \text{min}^{-1} \quad \omega := 2 \cdot \pi \cdot \text{rpm}$
$\text{Rtt} := 14 \cdot \text{in}$
$\text{Lcoil} := 75 \cdot \text{in}$ Properties $\rho\text{sst} := 7817 \cdot \dfrac{\text{kg}}{\text{m}^3} \quad \begin{array}{l}\mu\text{sst} := 0.28 \\ \text{Esst} := 28 \cdot 10^{-6} \cdot \text{psi}\end{array} \quad \text{dLdT625} := 0.0024 \dfrac{\text{in}}{\text{in}}$ Integrated thermal contraction 300 K-30 K Hoop Stress from Rotating Forces $\text{velsst} := \omega \cdot \text{Rtt} \qquad \sigma\text{rsst} := \rho\text{sst} \cdot \text{velsst}^2 \qquad \sigma\text{sst} = 2.038 \times 10^4 \text{ psi}$ Thermal Strains with torque tubes on both ends attached 35% up the coil assembly $\text{per} := 35\% \quad \text{ttL} := 14 \cdot \text{in} + \text{per} \cdot \text{Lcoil} \quad \text{ttL} = 40.25 \text{ in} \quad \text{ttTH} := 0.125 \cdot \text{in}$
$\text{csTH} := 0.5 \cdot \text{in}$ Total thermal contraction $\text{dLtot} := \dfrac{\text{dLdT625}}{2} \cdot \text{ttL} \cdot 2 + \text{dLdT625} \cdot \text{L} \cdot \text{coil} \cdot (1 - 2 \, \text{per}) \qquad \text{dLtot} = 0.151 \text{ in}$ $\text{Ltot} := 2 + \text{Lcoil} \cdot (1\text{-}2 \cdot \text{per}) \qquad \text{Ltot} = 103 \text{ in} \qquad \text{Lcs} := \text{Lcoil} \cdot (1 - 2 \cdot \text{per})$
$\text{Lcs} = 22.5 \text{ in}$

"X"

Spring constants $\text{Ktt} := (2 \cdot \pi \cdot \text{Rtt} \cdot \text{ttTH}) \cdot \dfrac{\text{Esst}}{\text{ttL}}$ $\text{Kcrb} := (2 \cdot \pi \cdot \text{Rtt} \cdot \text{csTH}) \cdot \dfrac{\text{Esst}}{\text{Lcs}}$ $\text{Ktot} := \dfrac{1}{\dfrac{1}{\text{Ktt}} - \dfrac{1}{\text{Kcrb}} - \dfrac{1}{\text{Ktt}}} \quad \text{Ktot} = 3.575 \times 10^6 \, \dfrac{\text{lbf}}{\text{in}} \qquad \begin{array}{l}\text{Ften} := \text{Ktot} \cdot \text{dLtot} \\ \text{Ften} = 5.384 \times 10^5 \text{ lbf}\end{array}$ Torque tube Stress due to Shrink $\sigma\text{strain} := \dfrac{\text{Ften}}{2 \cdot \pi \cdot \text{Rtt} \cdot \text{ttTH}} \qquad \sigma\text{strain} = 48961.393 \text{ psi} \qquad \text{thermal}$ Torque Analysis Fault := 2
$T1 := P1 \cdot (2 \cdot \pi \cdot \text{rpm})^{-1} \qquad \text{Gsst} := \dfrac{\text{Esst}}{2 \cdot (1 + \mu\text{sst})} \qquad \begin{array}{l}\text{Jtt} := 2\pi \cdot \text{Rtt}^3 \cdot \text{ttTH} \\ T1 = 1.061 \times 10^5 \text{ J}\end{array}$ $T1 = 9.391 \times 10^5 \text{ in} \cdot \text{lbf}$ $\tau\text{max} := \dfrac{T1 \cdot \text{Rtt} \cdot \text{Fault}}{\text{Jtt}} \qquad \tau\text{max} = 1.22 \times 10^4 \text{ psi} \qquad \text{assumes both sides full fault}$ $\text{VM} := \dfrac{\sigma\text{strain} + \sigma\text{sst}}{2} + \sqrt{\left(\dfrac{\sigma\text{strain} + \sigma\text{sst}}{2}\right)^2 + \tau\text{max}^2} \qquad \text{VM} = 5.346 \times 10^4 \text{ psi}$ There will be bending on the ends and some Piosons effect due to spinning
These are running loads so ⅔ Sy with room temp. properties should be used. Inconel 625 should be OK $\text{kdT} := 28 \cdot \dfrac{\text{watt}}{\text{cm}} \qquad \text{Qtt} := \dfrac{2 \cdot \text{kdT} \cdot 2 \cdot \pi \cdot \text{Rtt} \cdot \text{ttTH}}{\text{ttL}} \quad \begin{array}{l}\text{ttL} = 40.25 \text{ in} \\ \text{Qtt} = 38.857 \text{ W}\end{array}$ Basic Parameters $P1 := 40 \cdot 10^6 \cdot \text{watt} \quad \text{rpm} := 3600 \cdot \text{min}^{-1} \quad \omega := 2 \cdot \pi \cdot \text{rpm}$
$\text{Rtt} := 14 \cdot \text{in}$
$\text{Lcoil} := 75 \cdot \text{in}$ Properties $\mu\text{sst} := 0.28$

What is claimed is:

1. A rotor assembly configured to rotate within a stator assembly of a rotating machine having a shaft disposed within a non-cryogenic region of the rotor assembly, the rotor assembly comprising:
   a superconducting winding assembly positioned within a cryogenic region of the rotor assembly, the superconducting winding assembly, in operation, generating a magnetic flux linking the stator assembly; and
   a torque transfer assembly including first and second tubes that are positioned in a radial space external to the superconducting winding assembly and that extend along a longitudinal axis of the rotor assembly.

2. The rotor assembly of claim 1 wherein the torque transfer assembly is mechanically coupled to the superconducting winding assembly and extends between the non-cryogenic region and the cryogenic region of the rotor assembly.

3. The rotor assembly of claim 1, further comprising:
   a flange, wherein the torque transfer assembly axially extends from the flange and over a portion of the superconducting winding assembly.

4. The rotor assembly of claim 1 wherein the lengths of the first and second tubes are sufficient for providing substantial thermal isolation of the superconducting winding assembly.

5. The rotor assembly of claim 1 wherein the torque transfer assembly includes a ring to mechanically couple to the superconducting winding assembly.

6. The rotor assembly of claim 1 wherein the torque transfer assembly includes a first ring to mechanically couple the first tube to the superconducting winding assembly and a second ring to mechanically couple the second tube to the superconducting winding assembly.

7. The rotor assembly of claim 1 wherein the first tube is mechanically coupled to a first flange and axially extends over a portion of the superconducting winding assembly, the second tube is mechanically coupled to a second flange and axially extends over another portion of the superconducting winding assembly.

8. The rotor assembly of claim 1 wherein the length of the first tube and the length of the second tube are different.

9. The rotor assembly of claim 1 wherein a space between the first tube and the second tube is sufficient for providing substantial thermal isolation of the superconducting winding assembly.

10. The rotor assembly of claim 1 wherein the lengths of the first and second tubes are sufficient for providing support to the superconducting winding assembly.

11. The rotor assembly of claim 1 wherein the first tube includes a thermally conductive material.

12. The rotor assembly of claim 11 wherein the thermally conductive material comprises Inconel.

13. The rotor assembly of claim 1 further comprising a plurality of spokes, each spoke mechanically radially fixing the superconducting winding assembly to the shaft.

14. The rotor assembly of claim 1 wherein the first tube is mechanically coupled to a ring with a weld joint.

15. The rotor assembly of claim 1 wherein the superconducting winding assembly includes a high temperature superconductor.

16. The rotor assembly of claim 1 wherein the superconducting winding assembly includes a support tube.

17. The rotor assembly of claim 1 is configured to rotate at speeds of at least 3000 rpm.

18. A rotating machine comprising:
   a shaft disposed within a non-cryogenic region of the rotating machine;
   a stator assembly;
   a rotor assembly surrounded by the stator assembly and including:
      a superconducting winding assembly positioned within a cryogenic region of the rotor assembly, the superconducting winding assembly, in operation, generating a magnetic flux linking the stator assembly; and
      a torque transfer assembly including first and second tubes that are positioned in a radial space external to the superconducting winding assembly and that extend along a longitudinal axis of the rotor assembly.

19. The rotating machine of claim 18 wherein the rotor assembly includes a flange, the torque transfer assembly axially extends from the flange and over a portion of the superconducting winding assembly.

20. The rotating machine of claim 18 wherein the lengths of the first and second tubes are sufficient for providing substantial thermal isolation of the superconducting winding assembly.

21. The rotating machine of claim 18 wherein a space between the first tube and the second tube is sufficient for providing substantial thermal isolation of the superconducting winding assembly.

22. The rotating machine of claim 18 wherein a space between the first tube and the second tube is sufficient for providing support to the superconducting winding assembly.

23. The rotating machine of claim 18 wherein the torque transfer assembly includes a first ring to mechanically couple the first tube to the superconducting winding assembly and a second ring to mechanically couple the second tube to the superconducting winding assembly.

24. The rotating machine of claim 18 wherein the first tube is mechanically coupled to a first flange and axially extends over a portion of the superconducting winding assembly, the second tube is mechanically coupled to a second flange and axially extends over another portion of the superconducting winding assembly.

25. The rotating machine of claim 18 wherein the first tube comprises Inconel.

* * * * *